(12) United States Patent
Geyer

(10) Patent No.: US 11,495,902 B2
(45) Date of Patent: Nov. 8, 2022

(54) ELECTRICAL CONDUCTOR AND ELECTRICAL INTERFACE

(71) Applicant: Robert Bosch GmbH, Stuttgart (DE)

(72) Inventor: Hans Geyer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 17/280,251

(22) PCT Filed: Sep. 9, 2019

(86) PCT No.: PCT/EP2019/073982
§ 371 (c)(1),
(2) Date: Mar. 26, 2021

(87) PCT Pub. No.: WO2020/064312
PCT Pub. Date: Apr. 2, 2020

(65) Prior Publication Data
US 2022/0123487 A1    Apr. 21, 2022

(30) Foreign Application Priority Data

Sep. 26, 2018    (DE) .................... 10 2018 216 386.3

(51) Int. Cl.
*H01R 13/02*    (2006.01)
*H01R 13/03*    (2006.01)
*H01R 13/04*    (2006.01)
*H01R 13/10*    (2006.01)

(52) U.S. Cl.
CPC ........... *H01R 13/025* (2013.01); *H01R 13/03* (2013.01); *H01R 13/04* (2013.01); *H01R 13/10* (2013.01)

(58) Field of Classification Search
None
See application file for complete search history.

(56) References Cited

U.S. PATENT DOCUMENTS

| 8,371,869 B2 | 2/2013 | Shigihara |
| 9,991,620 B1 | 6/2018 | Boyer et al. |
| 2006/0228140 A1 | 10/2006 | Swift et al. |
| 2013/0217279 A1 | 5/2013 | Hemond et al. |
| 2015/0303603 A1 | 10/2015 | Hemond et al. |
| 2021/0309522 A1* | 10/2021 | Fujimori ............ H01B 13/0016 |

FOREIGN PATENT DOCUMENTS

| DE | 102014114721 A1 | 4/2016 |
| DE | 102014119114 A1 | 6/2016 |
| EP | 543503 A1 | 5/1993 |

OTHER PUBLICATIONS

Translation of International Search Report for Application No. PCT/EP2019/073982 dated Dec. 2, 2019 (2 pages).

* cited by examiner

*Primary Examiner* — Ross N Gushi
(74) *Attorney, Agent, or Firm* — Michael Best & Friedrich LLP

(57) ABSTRACT

The invention relates to an electrical conductor (1) having an electrical contact element (2) that is associated in particular with an interface (21) and has at least one electrical contact point (17), wherein the conductor (1) has a bundle (3) of electrical individual cores (4). Provision is made for the individual cores (4) to be carbon-nanostructure-based fibers (CNB), in particular carbon nanotubes (CNT), and for a segment (9) of each individual core (4) to have at least the one contact point (17) of the contact element (2). The invention further relates to an electrical interface (21).

18 Claims, 1 Drawing Sheet

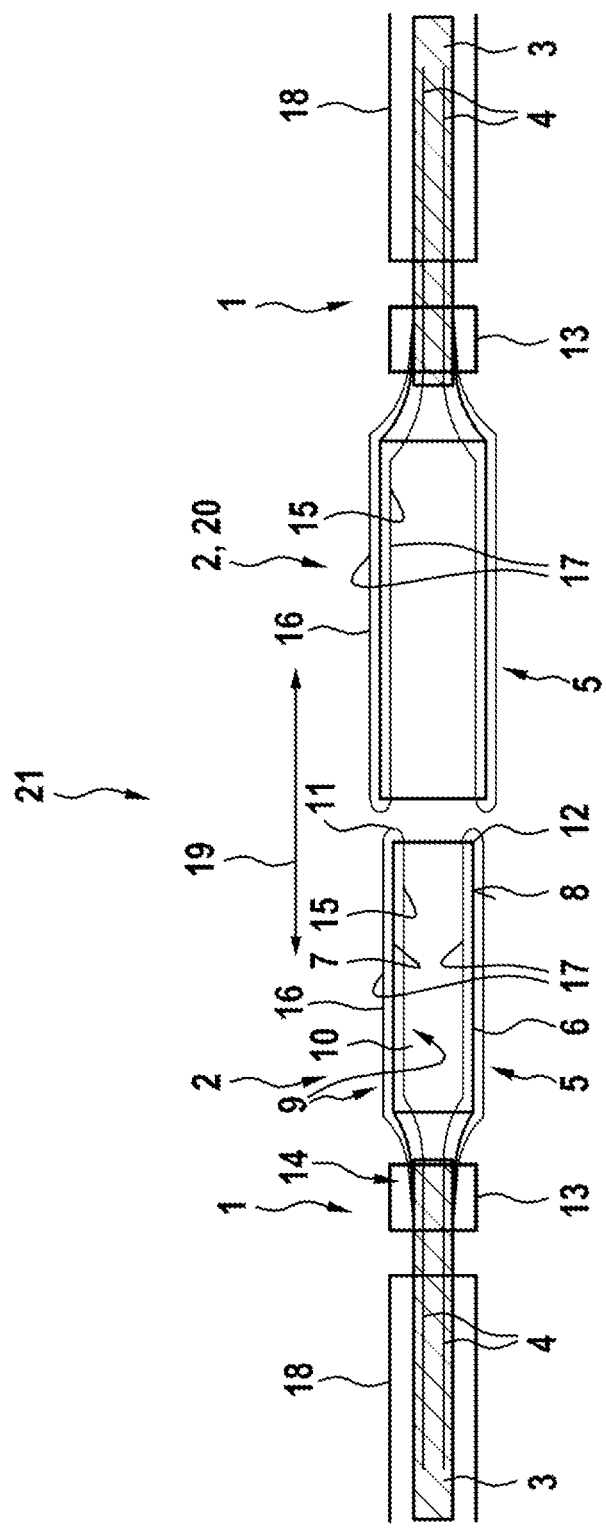

ELECTRICAL CONDUCTOR AND ELECTRICAL INTERFACE

BACKGROUND OF THE INVENTION

The invention relates to an electrical conductor having an electrical contact element that is associated in particular with an interface and has at least one electrical contact point, wherein the conductor has a bundle of electrical individual cores. The invention further relates to an electrical interface having at least one electrical conductor.

Carbon-nanostructure-based fibers (CNB), in particular carbon nanotubes (CNT), are known in principle. Fibers of this kind have a low electrical resistance, are very light and have good thermal conductivity properties. For electrotechnical applications, the current carrying capacity and the thermal conductivity are of particular interest. Single-walled carbon nanotubes have a density of 1.3 to 1.4 $g/cm^3$ and a tensile strength of approximately 30 GPa; embodiments with more walls have a density of approximately 1.8 $g/cm^3$ and a tensile strength of up to 63 GPa. In contrast, steel has a density of around 7.5 $g/cm^3$ and a maximum tensile strength of 2 GPa. This results in CNTs with more walls theoretically having an approximately 135 times as good a ratio of tensile strength to density (breaking length) with respect to steel.

SUMMARY OF THE INVENTION

The invention makes use of the specific properties of CNB fibers, in particular CNT fibers, and, in addition to very good electrical and thermotechnical values, results in a significant decrease in size of the structure compared to currently used copper-based technology, with the result that the invention provides an electrical conductor having a contact element, which brings about high savings with respect to space, outlay, weight and costs, which results in a great degree of freedom in the geometric embodiment of associated structural units, such as housings, for example. The electrical conductor according to the invention having the electrical contact element that is associated in particular with the interface has at least one electrical contact point on the contact element, wherein the conductor has a bundle of electrical individual cores, the individual cores are carbon-nanostructure-based fibers (CNB), in particular carbon nanotubes (CNT), and a segment of each individual core has at least the one contact point of the contact element. In the invention, carbon-nanostructure-based fibers are therefore used to form the electrical conductor, wherein the individual cores formed by the fibers have segments that each have a contact point of the contact element. The individual cores accordingly have a double function, since they conduct the electric current over their length and also each form the at least one contact point. Each individual core, that is to say each CNT fiber, therefore has said electrical contact point as a single-piece component, as a result of which a simple and economic design is created.

According to one development of the invention, provision is made for the individual cores to run for the most part essentially in parallel with one another. This parallel string of individual cores constitutes along the length thereof the electrical conductor. The mentioned parallelism is present here. This parallelism is omitted at points in the region of the contact element.

According to one development of the invention, provision is made for the contact element to have a support body, around which the segments of the individual cores run in a looped manner. The individual cores therefore extend into the contact element, that is to say they are involved with segments in the formation of the contact element. The mentioned loop shape is produced by virtue of the fact that the incoming individual cores are bent in the region of the contact element and are fed back a little. In this case, the support body produces the contour of the contact element and prescribes the loop-shaped profile of the respective individual core.

According to one development of the invention, it is advantageous that the support body is a contact sleeve, wherein the segments of the individual cores run through the interior of the contact sleeve, in particular along the inner side of the contact sleeve, and—at a turning point—run outwardly around an end of the contact sleeve. The incoming bundle of the individual cores widens in the region of the contact sleeve in such a way that, when they pass through the interior of the contact sleeve, the individual cores run along the inner side of the contact sleeve until they arrive at the turning point located at the end of the contact sleeve. At the turning point, the individual cores are fed outwardly around the end of the contact sleeve, preferably fed back by 180°.

According to one development of the invention, provision is made for sections of the segments of the individual cores to run—starting from the turning point—along the outer side of the contact sleeve, preferably opposite to sections of the segments that extend through the interior of the contact sleeve. The segments of the individual cores therefore each have two sections. One section of the respective individual core runs through the interior of the contact sleeve and the other section of the segment runs along the outer side of the contact sleeve. The contact sleeve preferably has a circular cross section.

Provision is preferably made for the segments of the individual cores to be arranged in a manner distributed over the circumference of the contact sleeve. The distribution is preferably effected over the circumference in a uniform manner.

According to one development of the invention, a crimp sleeve is provided, by way of which the positions of the individual cores are fixed, in particular, to the contact element. To this end, said crimp sleeve is associated with another end of the contact sleeve, preferably at a distance, wherein the crimp sleeve secures end zones of the segments of the individual cores in a manner pressed against the bundle of individual cores. The incoming bundle of individual cores running to the contact element is fed back at the turning point in a fanned-out manner and then pressed against the bundle of individual cores by means of the crimp sleeve.

One development of the invention makes provision for at least one contact point to be formed at each section of each individual core extending through the interior of the contact sleeve and/or for the at least one contact point to be formed at each section of each individual core running along the outer side of the contact sleeve. As a result, electrical contact connection of the contact element to a further electrical element either to the sections of the individual cores located in the interior of the contact sleeve and/or to the sections of the individual cores running on the outer side of the contact sleeve is possible.

According to one development of the invention, an electrical interface having at least one electrical conductor is provided, as has been described above; it is proposed here for the electrical interface to also have at least one further electrical conductor, which is constructed in a correspondingly identical manner to the first-mentioned conductor, but instead of the contact element has a mating contact element, wherein the contact element is plugged to the mating contact element for the purpose of electrical contact connection by virtue of the contact element being plugged into the interior of the mating contact element or the mating contact element being plugged into the interior of the contact element. Both conductors are constructed in a correspondingly identical manner. This also applies to the construction of the contact element and the mating contact element, wherein the contact element and the mating contact element differ only in size, in such a way that—as mentioned—it is possible to slide either the contact element into the interior of the mating contact element or to plug the mating contact element into the interior of the contact element. Compared to the contact element, the mating contact element accordingly has basically the same configuration as the contact element but is designed so as to be different in size. The interface therefore forms a contact system, which has an electrical contact connection of contact parts constructed essentially in an identical manner, in particular contact element and mating contact element.

BRIEF DESCRIPTION OF

The single drawing FIGURE illustrates an electrical conductor that is an exemplary embodiment of the invention.

DETAILED DESCRIPTION

The left-hand side of the drawing FIGURE shows an electrical conductor 1 having a contact element 2. The electrical conductor 1 has a bundle 3 of electrical individual cores 4. The FIGURE shows only two individual cores 4; however, more or fewer individual cores 4 can be provided. The individual cores 4 are embodied as carbon-nanostructure-based fibers (CNB), in particular as carbon nanotubes (CNT). The individual cores 4, which are closely adjacent to one another as a bundle 3 and preferably run in parallel or in a manner twisted with respect to one another, fan out in a widening fashion in front of a support body 5, which is formed as a contact sleeve 6. The contact sleeve 6 has a circular cross-sectional contour. The fanning out is effected in a manner distributed over the circumference of the contact sleeve 6, preferably in a manner distributed uniformly over the circumference. The contact sleeve 6 has an inner side 7 and an outer side 8. The arrangement has now been implemented in such a way that the individual cores 4 run with segments 9 through the interior 10 of the contact sleeve 6, and specifically along the inner side 7 of the contact sleeve 6 and—at a turning point 11—outwardly around an end 12 of the contact sleeve 6, wherein, from there, the segments 9 of the individual cores 4 run back along the outer side 8 of the contact sleeve 6, in the process extend over the entire length of the contact sleeve 6 and, from there, meet the bundle 3 again. Here, a crimp sleeve 13 is arranged, which comprises end zones 14 of the segments 9 of the individual cores 4 and also the bundle 3 of the individual cores 4 and is crimped in such a way that the end zones 14 are held in a manner pressed against the bundle 3 of the individual cores 4. The crimp sleeve 13 is preferably at a distance from the contact sleeve 6 in order to make it possible for the individual cores 4 to run in an arched manner. At least one electrical contact point 17 is formed at each section 15 of each individual core 4 that extends through the interior 10 of the contact sleeve 6. Furthermore, a contact point 17 is likewise formed at each section 16 of each individual core 4 that runs along the outer side 8 of the contact sleeve 6. The contact points 17 are produced by the corresponding surface areas of the individual cores 4 with very good electrical conductivity. If desired, an electrical insulation 18, which preferably ends slightly in front of the crimp sleeve 13, can be provided.

On the right-hand side of the FIGURE, a further electrical conductor 1 having a contact element 2 is provided, the electrical conductor being constructed in a correspondingly identical manner to the first-mentioned electrical conductor 1. For reasons of clarity, the conductor 1 on the right-hand side has not been illustrated with all of the reference signs again. A correspondingly identical construction applies to the contact element 2 on the right-hand side, but it differs in size compared to the contact element 2 shown on the left-hand side of the FIGURE in such a way that it is possible to plug the contact element 2 on the left-hand side into the interior of the contact element 2 on the right-hand side for the purpose of electrical contact connection. This is illustrated by a double-headed arrow 19. The contact element 2 on the right-hand side of the FIGURE should be referred to as mating contact element 20 for the purpose of differentiation. On account of the contact element 2 and the mating contact element 20 being plugged into one another, an electrical interface 21 is created overall, which can be plugged together for the purpose of contact connection and can be pulled apart from one another again for the purpose of ending the contact connection. In the electrical contact connection, the contact points 17 of the section 16 engage against contact points 17 of the section 15 of the mating contact element 20.

All of this makes it clear that an electrical interface 21 can also be formed in such a way that a mating contact element 20, which has an accordingly small diameter, can be plugged into the interior of the contact sleeve 6 of the contact element 2 on the left-hand side of the FIGURE. Or the left-hand contact element 2 is formed to have such a great diameter that it can be slid over the right-hand contact element 2 in the manner of a sleeve for the purpose of electrical contact connection.

The contact sleeve 6 and/or the crimp sleeve 13 preferably consist(s) of nickel-plated, silver-plated or gold-plated metal. A very low-impedance electrical connection is produced owing to the many points of contact that are produced when the contact element 2 and mating contact element 20 are plugged together at the contact points 17. Owing to the structure whereby electrically conductive carbon-nanostructure-based fibers (CNB), in particular carbon nanotubes (CNT), are located both on the outer side 8 and on the inner side 7 of the contact sleeve 2 and mating contact sleeve 20, each outer part of a contact pair can be used again as an inner part of a larger contact pair and vice versa. There is also the advantage that all parts of the mentioned contact pairs could be produced in the same manner since there is a correspondingly identical construction. Owing to the extreme strength of the carbon-nanostructure-based fibers, in particular carbon nanotubes, and the low degree of surface roughness thereof, a very high mating frequency is produced since only a very low amount of mechanical wear occurs upon contact connection. Through appropriate formation of the crimp sleeve 13, it is possible to form an insertion stop or a latching edge in order to make possible insertion into, in particular four-pole, plug housings.

What is claimed is:

1. An electrical conductor (1) having an electrical contact element (2) that has at least one electrical contact point (17), wherein the conductor (1) has a bundle (3) of electrical individual cores (4), characterized in that the individual cores (4) are carbon-nanostructure-based fibers (CNB), and a segment (9) of each individual core (4) has at least the one contact point (17) of the contact element (2), characterized in that the contact element (2) has a support body (5) around which the segments (9) of the individual cores (4) run in a looped manner.

2. The electrical conductor according to claim 1, characterized in that the individual cores (4) run for the most part essentially in parallel with one another.

3. An electrical interface (21) having at least one electrical conductor (1) according to claim 1, characterized in that the electrical interface (21) also has at least one further electrical conductor (1), which includes a bundle (3) of electrical individual cores (4), wherein the individual cores (4) are carbon-nanostructure-based fibers (CNB), the at least one further electrical conductor (1) includes a mating contact element (20) including at least one electrical contact point (17), wherein the contact element (2) of the at least one electrical conductor (1) is plugged to the mating contact element (20) the at least one further electrical conductor (1) for the purpose of electrical contact connection by virtue of the contact element (2) being plugged into an interior (10) of the mating contact element (20) or the mating contact element (20) being plugged into an interior (10) of the contact element (2).

4. The electrical conductor according to claim 1, characterized in that the support body (5) is a contact sleeve (6), wherein the segments (9) of the individual cores (4) run through an interior (10) of the contact sleeve (6) along the inner side (7) of the contact sleeve (6), and—at a turning point (11) —run outwardly around an end (12) of the contact sleeve (6).

5. The electrical conductor according to claim 1, characterized in that the support body (5) is a contact sleeve (6), wherein the segments (9) of the individual cores (4) run through an interior (10) of the contact sleeve (6), and—at a turning point (11) —run outwardly around an end (12) of the contact sleeve (6).

6. The electrical conductor according to claim 5, characterized in that sections (16) of the segments (9) of the individual cores (4) run—starting from the turning point (11) —along an outer side (8) of the contact sleeve (6).

7. The electrcial conductor according to claim 5, characterized in that the segments (9) of the individual cores (4) are arranged in a manner distributed over the circumference of the contact sleeve (6).

8. The electrical conductor according to claim 5, further comprising a crimp sleeve (13) of the contact element (2), said crimp sleeve being associated with another end of the contact sleeve (6), wherein the crimp sleeve (13) secures end zones (14) of the segments (9) of the individual cores (4) in a manner pressed against the bundle (3) of individual cores (4).

9. The electrical conductor according to claim 5, characterized in that at least one contact point (17) is formed at each section (15) of each individual core (4) extending through the interior (10) of the contact sleeve (6) and/or in that at least one contact point (17) is formed at each section (16) of each individual core (4) running along the outer side (8) of the contact sleeve (6).

10. The electrical conductor according to claim 5, characterized in that sections (16) of the segments (9) of the individual cores (4) run—starting from the turning point (11) —along an outer side (8) of the contact sleeve (6), opposite to sections (15) of the segments (9) that extend through the interior (10) of the contact sleeve (6).

11. The electrical conductor according to claim 5, further comprising a crimp sleeve (13) of the contact element (2), said crimp sleeve being associated with another end of the contact sleeve (6) and being located at a distance therefrom, wherein the crimp sleeve (13) secures end zones (14) of the segments (9) of the individual cores (4) in a manner pressed against the bundle (3) of individual cores (4).

12. An electrical conductor (1) having an electrical contact element (2) that is associated with an interface (21) and that has at least one electrical contact point (17), wherein the conductor (1) has a bundle (3) of electrical individual cores (4), characterized in that the individual cores (4) are carbon nanotubes (CNT), and a segment (9) of each individual core (4) has at least the one contact point (17) of the contact element (2), characterized in that the contact element (2) has a support body (5) around which the segments (9) of the individual cores (4) run in a looped manner.

13. The electrical conductor according to claim 12, characterized in that the individual cores (4) run for the most part essentially in parallel with one another.

14. The electrical conductor according to claim 12, characterized in that the support body (5) is a contact sleeve (6), wherein the segments (9) of the individual cores (4) run through an interior (10) of the contact sleeve (6) along an inner side (7) of the contact sleeve (6), and—at a turning point (11) —run outwardly around an end (12) of the contact sleeve (6).

15. The electrical conductor according to claim 14, characterized in that sections (16) of the segments (9) of the individual cores (4) run—starting from the turning point (11) —along an outer side (8) of the contact sleeve (6), opposite to sections (15) of the segments (9) that extend through the interior (10) of the contact sleeve (6).

16. The electrical conductor according to claim 15, characterized in that the segments (9) of the individual cores (4) are arranged in a manner distributed over the circumference of the contact sleeve (6).

17. The electrical conductor according to claim 16, further comprising a crimp sleeve (13) of the contact element (2), said crimp sleeve being associated with another end of the contact sleeve (6) and being located at a distance therefrom, wherein the crimp sleeve (13) secures end zones (14) of the segments (9) of the individual cores (4) in a manner pressed against the bundle (3) of individual cores (4).

18. The electrical conductor according to claim 17, characterized in that at least one contact point (17) is formed at each section (15) of each individual core (4) extending through the interior (10) of the contact sleeve (6) and/or in that at least one contact point (17) is formed at each section (16) of each individual core (4) running along the outer side (8) of the contact sleeve (6).

\* \* \* \* \*